Feb. 11, 1958  A. C. PETERSON  2,822,792
DIRECT AND INDIRECT INJECTION MEANS FOR COMBUSTION ENGINES
Filed Nov. 8, 1956  3 Sheets-Sheet 1
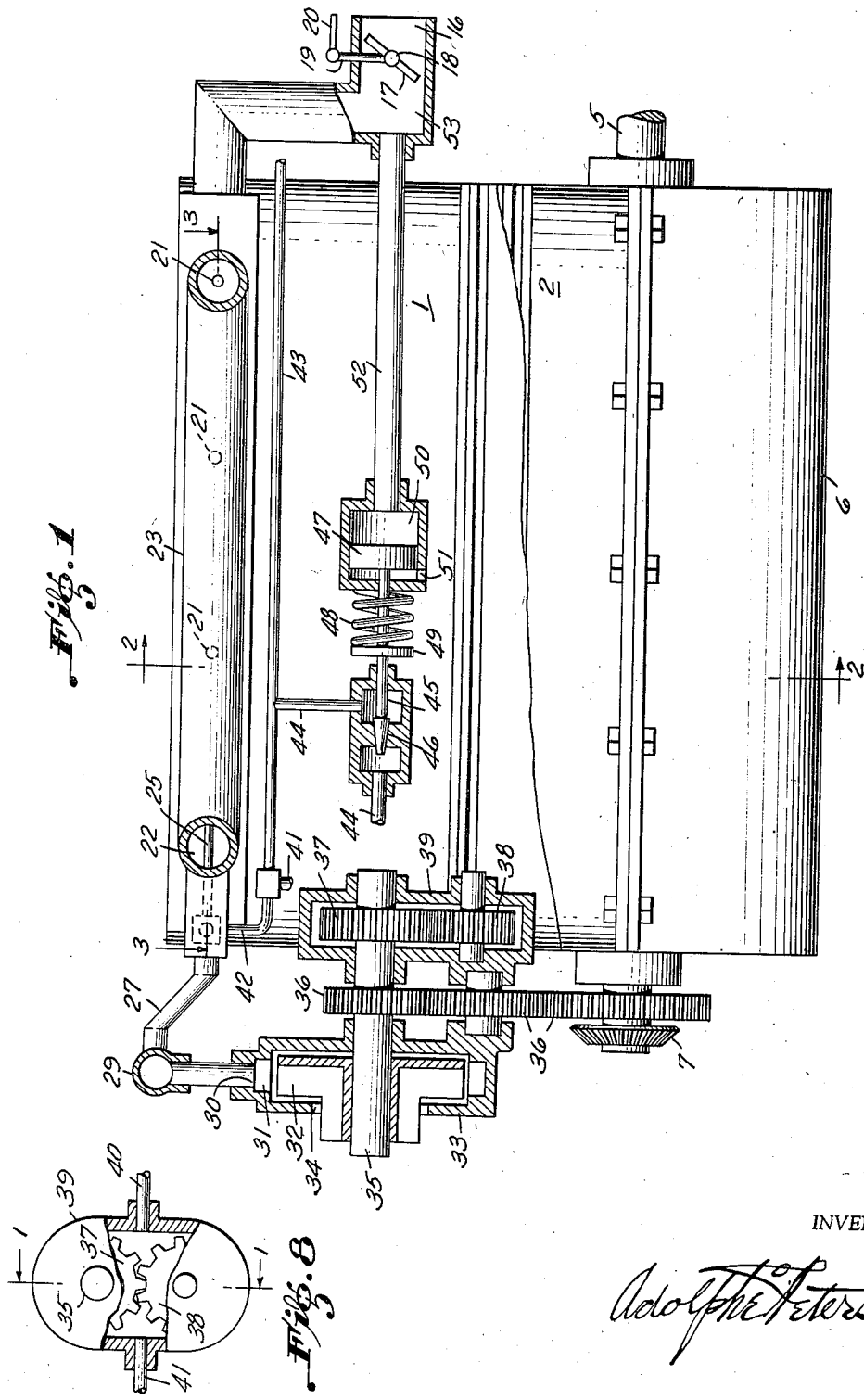
INVENTOR
Adolphe Peterson.

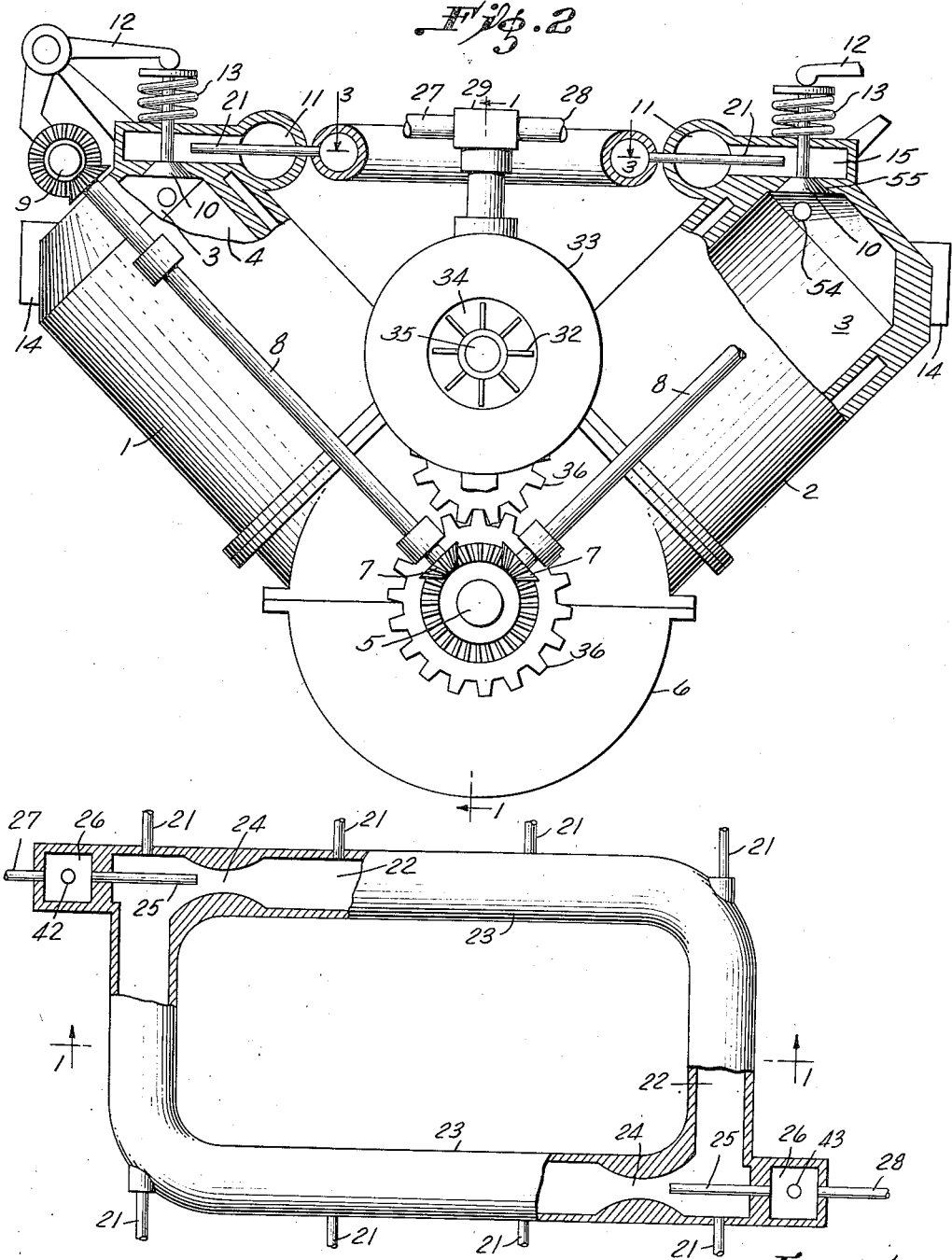

Feb. 11, 1958     A. C. PETERSON     2,822,792
DIRECT AND INDIRECT INJECTION MEANS FOR COMBUSTION ENGINES
Filed Nov. 8, 1956     3 Sheets-Sheet 3

INVENTOR

Adolphe C. Peterson.

United States Patent Office 2,822,792
Patented Feb. 11, 1958

2,822,792

DIRECT AND INDIRECT INJECTION MEANS FOR COMBUSTION ENGINES

Adolphe C. Peterson, Minneapolis, Minn.

Application November 8, 1956, Serial No. 621,114

18 Claims. (Cl. 123—52)

My invention relates to the injection type of fuel distribution in internal combustion engines, and to a system which is adapted for either direct or indirect injection, and it is therefore called—direct or indirect injection means for combustion engines.

The principal objects of my invention are to provide a form of injection means which shall be simple in construction, relatively free from troubles in use, and relatively cheap in cost of manufacture. A chief object is to provide a fuel injection system which shall have relatively simple fuel metering means so the metering of the fuel does not present difficulties either in the manufacture or use of the means. A further object is the provision of such means which shall not have difficulties in the distribution of fuel to the individual cylinders of an engine, because the fuel control is not of a very intricate nature and does not require extremely finely constructed elements at each cylinder location. A principal object is the provision of a means of distribution and injection which shall be especially adapted to use in such engines as are used for automobiles, trucks, busses and tractors, while it is also well adapted for use in the larger engines, such as are used in independent rail cars, industrial plants or locomotives. Injection means have not been considered especially well adapted to use in the smaller engines, such as are used in automobiles, and it is therefore a major object in this design, to provide an engine injection means which is adapted to such use.

The principal devices and combinations of devices in my invention, are as hereinafter described and as defined in the appended claims. In the accompanying drawings which illustrate my invention in several different forms, like characters refer to like parts throughout the views, in so far as practicable. Referring to the drawings:

Figure 1 is a view, partly in side elevation, and partly in section, vertically, on the lines 1—1 of Figures 2 and 3, of a V8 type reciprocating piston engine, one engine cylinder block being broken away, and to which my injection means is applied.

Figure 2 is a view partly in end elevation looking from the left of Figure 1, and partly in vertical cross section on the line 2—2 of Figure 1, this view showing particularly the fuel injection nozzles at the air intake valves of one cylinder of each engine cylinder block.

Figure 3 is a detail view of the so-called conduit circuit, and the means especially related therewith, and this view is partly a view in plan and partly a view in horizontal cross section, on the line 3—3 of Figures 1 and 2, through that detail apparatus.

Figure 4 is a view in side elevation, some parts in vertical section on the line 4—4 of Figure 5, some parts broken away.

Figure 5 is a view partly in plan, and partly in horizontal section on the line 5—5 of Figure 4, this section being through the conduit circuit of this form and related means.

Figure 6 is a detail view to show the injection valve operating means as associated with the cam shaft, for timing.

Figure 7 is a diagram to show the relative timing of fuel injection in this form, it being contemplated that if this form is applied to a high compression engine with high pressure distribution, that timing may be as is customary in diesel type engines.

Figure 8 is a vertical cross section on line 8—8, Figure 1, showing the cross section through the fuel pump means.

Figure 4:
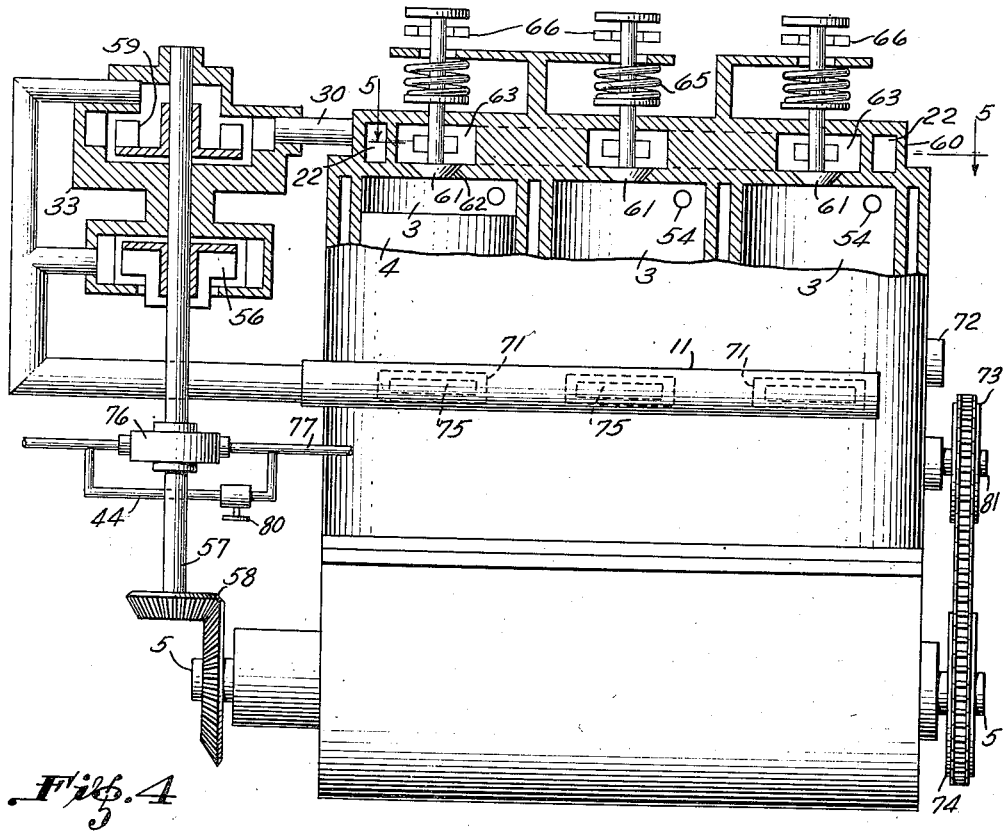
Figures 4, 5, 6 and 7 are views of a modified form of my device adapted more especially to the two cycle type of engine, whether high or low pressure, and of these views.

Referring first to the form of my invention as it is shown in Figures 1, 2 and 3, there is here illustrated the device as applied to a V8 type reciprocating piston engine with two cylinder blocks, each of four cylinders, and designated 1 and 2, respectively, the block 2 being shown broken away in Figure 1. This engine has individual cylinders 3, pistons 4 (of which one only is shown), there being eight in all; crank shaft 5, crank case 6, bevel gears 7 driving shafts 8 and cam shafts 9, inlet valves 10 for air intake from a manifold 11 on one side and 11 on the other side, valve operating levers 12, springs 13. There are exhaust manifolds 14 with which exhaust valves (not shown) cooperate in the usual or well known manner to exhaust gases during exhaust phases of the cycle of each cylinder 3. The inlet and exhaust valves and manifolds receive and exhaust in the manner of four cycle engines, such as are well known. Each inlet valve 10 is associated with an individual valve chamber 15 and each of the said valve chambers 15 receive air from the associated manifolds 11, and the latter at one end of each are connected with and receive air from the common air inlet port 16 and the latter is controlled to be closed or opened by a throttle valve 17, the latter being oscillatable on its axis 18 by means of the lever 19 and a linkage 20 by means of which the throttle valve 17 is manually controlled by an operator or driver.

Each inlet valve chamber 15 has delivering directly into the individual valve chamber adjacent the stem of its associated valve 10, and the valve 10, a fuel nozzle 21, there being one such fuel nozzle for each valve chamber 15, eight in all. All the fuel nozzles 21 are connected individually with a conduit circuit 22 which is formed within an endless circuitous pipe 23 which is generally formed in the shape of a rectangle, the corners, however, being curved as shown. The conduit circuit within the pipe 23 is one continuous conduit passing through all the sides of the rectangular shape formed by the pipe 23 and all such sides being joined at the curved corners of pipe 23 so that there is thus formed one continuous circuitous conduit, specifically named a conduit circuit, and in which gaseous fluid as air may flow, bearing fuel with it, in one continuous flow around the condiut circuit and repeatedly and continuously, as hereinafter further described. The individual nozzles 21 deliver from the said conduit circuit at spaced locations around the circuit, such locations at one side of the rectangle shape being adjacent the intake valve chambers 15 of the one cylinder block 1 and being adjacent the intake valve chambers 15 of the other cylinder block 2 at the other side of the said rectangular shaped pipe 23. The nozzles 21 have an exactly equal delivery through each of the eight nozzles 21 into the intake valve chambers 15, and the fuel nozzles 21 must be so made that the apertures through them are all as nearly exactly alike or similar in capacity for volumetric passage of fluid in a given period of time as they may be made, for the passage of the air and air borne fuel in the manner as herein after described.

The pipe 23 has formed with it at two of its corners, and at locations diametrically oppositely, two venturi sections or conformations in the pipe 23, so that these venturis are a part of the conduit circuit 22, that is, so that fluid flowing through the conduit circuit 22 must necessarily flow through each of these venturis, which are each designated 24. Each venturi 24 has extended into it and directed into it a nozzle 25, there being two of the latter, one for each venturi 24. Each of these nozzles 25 pass fluid from one of the two mixing chambers 26, to each of which air under a comparatively low pressure is delivered by pipes 27 and 28, respectively, each of the two pipes 27, 28 being joined with and connected with a common pipe 29 by which air under low pressure is passed from the outlet 30 of the diffusion chamber 31 which is annularly arranged around the compressor rotor 32 which is rotatable in the compressor casing 33 and to which air is passed from atmosphere by means of the air intake 34.

The air compressor rotor 32 is fixed firmly on a shaft 35 and to be rotated by the latter, as the latter is rotated through a gear train 36 by means of the crank shaft 5, one spur gear of the gear train 36 being fixed on the end of the crank shaft 5 to rotate with it. The gear train 36 drives the compressor rotor 32 at a speed which may be several times the speed of the crank shaft 5, so that the compressor rotor 32 will thus be operated at a much faster speed than the engine crank shaft 5. The latter is in the usual manner of four cycle engines connected by cranks and connecting rods (not shown) with the pistons 4 of the engine. The shaft 35 also has fixed on it one spur gear 37 of the gears 37, 38, which form the gear type of fuel pump and which operate in the pump casing 39, the gears 37, 38 of the pump being driven at the same speed as the compressor rotor 32 (or at any other appropriate speed), but always at the speed which is proportionate with the speed of the engine crank shaft 5, and therefore also proportionate with the speed of the cycle of operation, at any particular time, of the engine cylinders.

The fuel pump, generally designated 39, receives liquid fuel by way of supply pipe 40 and delivers by pipe 41 (a common pipe) to two separate individual pipes 42, 43, respectively, which deliver, one to the mixing chamber 26 associated with one venturi 24, and the other to the other mixing chamber 26 associated with the other venturi 24, and the pipes and outlets thereof, in the mixing chambers, are so exactly equal so that fuel will flow approximately equally from each of the two pipes 42, 43, to the mixing chambers 26 for admixture there with air flowing to the chamber from the compressor outlet 30. One of the pipes 42, 43, has connected with it a by-pass pipe 44 by which fuel may be returned to the supply pipe 40 when a fuel valve 45 is lifted from its seat 46, by means of the control piston 47 (a pressure responsive piston), the control piston being fixed on the right end of the shaft of the valve 45. A spring 48 of coil type yieldably returns the valve 45 to its seat by pressure against the flange 49 fixed on the stem or shaft of valve 45. The pressure of the spring 48 must be sufficient to seat the valve 45 firmly on its seat when the piston 47 is not pulled by a degree of vacuum in the piston chamber 50. One side of the piston is open to atmosphere by port 51 and the other side of the piston chamber connects by pipe 52 with the suction side of the throttle valve chamber 53 wherein throttle valve 17 is located, so that the pressure responsive piston 47 is at all times subjected to whatever pressure or vacuum is on the suction side of the throttle valve 17.

The nozzles 25, it should be especially noted, are directed into the venturis 24 in such manner that each nozzle 25 directs its stream of air borne fuel into the venturi and therefore also into the stream of fluid flowing circuitously in the conduit circuit 22, that the impulse of each stream serves to thrust or inject the circuitous stream into its venturi so that the impulses, rotatively of the circuit of conduit circuit 22, are directed in the same direction, and so that also the suction of the injection impulse by means of the stream from the nozzles 25, upon the stream of the circuit, is in the same direction of the rotation. Thus each of the injected streams from nozzles 25 serve to propel and impel the air borne fuel stream in the circuit 22 in the same direction of rotation, and the rotation is thus continuously impelled and maintained. The result is that the air borne fuel stream in the conduit circuit 22 will revolve in the circuit 22 at a relatively high speed, this depending however on the pressure and speed of the flow from the nozzles 25. The pressure of the air from compressor discharge 30 and the pressure of the fuel flow to the mixing chambers 26 must be such that a rapid rotation of the stream will be caused at substantially all times in operation of the device, and thus the air borne fuel stream will be kept in continuous flow and agitation, and the fuel particles, as sprayed from the fuel nozzles of the pipes 42, 43, will be kept continuously separated and commingled with the air stream in substantially equal proportion throughout the circuit of the stream in the conduit circuit 22, and the result of this will be, that the air borne fuel stream will at all times, at relatively all locations of the circuit, have relatively the same proportion of fuel, and the fuel air stream ejected from circuit 22 by way of the nozzles 21 delivering to the intake valve chambers 15 will have in each chamber 15 relatively the same proportion of fuel, and therefore fuel distribution will be substantially equal in volumetric proportion, to each of the combustion units (engine cylinder and intake valve chamber).

Spark plugs 54 provide for ignition in the cylinders and these are provided with ignition current cyclically in the usual manner of four cycle electrical ignition type engines, such electric distribution means not being shown.

The operation in general is now described. The engine crank shaft is started by any means for such engines, such means being well known. The fuel supply pipe is supplied with an appropriate fuel such as gasoline from any source such as a tank for fuel. As soon as the crank shaft 5 is rotated by the starter means (not shown) the compressor rotor 32 inducts air and compresses it sufficiently to blow the air into the conduit circuit 22 by way of the nozzles 25 and the mixing chambers 26, and simultaneously fuel is pumped by the pump 37—38 to the fuel pipes 42—43 and is accordingly mixed with the air in the mixing chambers 26. The movement of air and fuel into the conduit circuit 22 from the nozzles 25, being in a direction, as to each nozzle 25, to cause the same direction of circulation in the conduit circuit 22, circulation of air with its admixed fuel in a spray form and somewhat vaporized or wholly vaporized, becomes rapid, since the air and fuel is injected from nozzles 25 into the venturis 24 at a relatively high pressure as compared to pressure in the conduit circuit 22, and this injection into the venturis 24 causes suction on the fluid behind it in the conduit circuit, and pressure against the fluid ahead of it.

Simultaneously suction is caused on the nozzles 21 by the suction from the intake ports when opened by the intake valves 10. The intake ports are designated 55. Thus there is simultaneously flow from the nozzles 21 into the intake valve chambers 15 and air flow from the air manifold 11, the throttle valve being set manually to permit a required flow of atmospheric air through manifolds 11 to the air intake ports 55 as they are cyclically opened. The flow from the nozzles 21 is continuous but not in proportionately large quantity, as the ports of the nozzles 21 are of so limited a volumetric capacity of flow that the flow is thus limited. The pressure of air from the compressor rotor discharge 30 is assumed to be approximately ten pounds per square inch more or less, sufficient so that a rapid discharge from nozzles 25 is secured and a rapid circulation in conduit circuit 22

There is a small accumulation of fuel in each inlet valve chamber 15 before associated valve 10 opens and this is immediately inducted to the cylinder with the first flow of air from air manifolds 11 and the fuel air mixture continues to flow during the balance of each intake portion of the engine cylinder cycle. During the compression stroke the air fuel mixture is compressed in a cylinder, as in each of them, and at the maximum compression period, ignition takes place by means of the spark plug 54 in a cylinder.

When the engine has taken up its cycle of operation, the flow of air to intake manifolds 11 is governed or throttled or permitted as throttle valve 17 is placed by the operator or driver, and if he opens this throttle valve 17 completely air flow to the manifolds 11 so that pressure there is almost at atmosphere and thereupon the control piston 47 moves leftwardly to permit spring 48 to fully seat the by-pass valve 45 on its seat and fully close the by-pass so there is then full delivery of fuel to the mixing chambers 26 and full power of the engine. When the throttle valve 17 is partially closed or almost entirely closed, there is suction upon the control piston 47 from the partial vacuum in the manifolds 11 and thereupon the control piston 47 moves rightwardly in Figure 1 and pulls the fuel valve 45 from its seat in a more or less degree of movement, and accordingly to the proportion of opening of the by-pass, the fuel as pumped by pump 37—38, is permitted to flow backwardly to the supply pipe. Thus fuel delivery is proportionate to the air flow from the manifolds 11 to the engine cylinders of the engine. Thus air and fuel flow are controlled and power delivery is controlled.

It should be noted that the ports and apertures of all devices controlling fluid flow, must be so proportioned as to secure the adequate flow but not excessive flow from each device, and that especially the apertures through the nozzles 25 and the nozzles 21 must be so proportioned and so limited as to secure the adequate flow but not excessive flow, and the flow of air from nozzles 21 with fuel may be such that at idling speeds and power of the engine, approximately a sufficient flow of air will pass from nozzles 21 with the fuel to procure an adequate combustion mixture for idling power, and that there may then be little or no flow of air from the air manifolds 11 past the throttle valve 17. The formation of the seat 46 of fuel valve 45 and the formation of the fuel valve or by-pass valve 45 may be such as to procure an adequate proportioning of fuel delivery in accordance with the air flow from the main air intake port as controlled by valve 17.

Referring now to the form of my device as shown by the Figures 4, 5, 6, 7 there is here shown my device as applied to a two cycle engine of ignition or low pressure type, not diesel type. In this form, as shown, the compressor means for the air for the conduit circuit is contemplated to that form of compressor which is best suited to the particular type of engine, with direct fuel delivery, as is desired in a particular construction, and that construction may be for a diesel cycle with high compression, or an ignition type with high compression or an ignition type with low compression. It is shown as a type with low compression, that is not more than such as may be used with spark ignition, although the form of my device, with direct injection of fuel to the cylinders, may as stated, be either of the high compression diesel compression ignition, or the low pressure type.

The crank shaft 5 in crank case 6 reciprocates pistons of which one is shown in three cylinders 3, and these cylinders are supplied with combustion air by way of an air manifold 11 conveying air under a pressure of say five to ten pounds from the centrifugal compressor rotor 56 which is rotated by shaft 57 by means of bevel gears 58. This shaft 57 also drives the compressor rotor, also of centrifugal type, designated 59, but this rotor 59 is of slightly larger diameter than rotor 56, and this compressor 59 receives air under the low pressure from compressor rotor 56, so that compressor rotor 59 delivers air under a somewhat higher pressure say fifteen to twenty pounds, more or less, to the compressor discharge 30 to the nozzles 25, which as in the first form described inject the air from that compressor to a conduit circuit 22 where-in the air is circulated at relatively high speed and fuel is injected to that air by way of two fuel nozzles 21 which, in this case, are directed into the venturis 24 so that air flow past the fuel nozzles picks up the fuel there and sprays it and disseminates it and commingles it with the flowing air so as to form a mixture of uniform proportions of air and fuel in the conduit circuit 22, it being noted that rapid circulation of the air and fuel in conduit circuit 22 tends to increase the mixing of the air and fuel. The conduit circuit 22 is in this case formed as a circuit in the engine head 60 about the fuel injection valves 61 which control passage through injection ports 62 from the injection chambers 63 which is formed about the stem of the injection valve 61. This chamber 63, one about each of the three fuel injection valves 61, receives the fuel air mixture from conduit circuit 22, by way of a passage 64, there being a passage 64 or two of such passages 64 to each chamber 63 from the circuit 22 and the passages 64 of each chamber 63 are exactly equal in volumetric flow capacity to the passages or ports 64 of the other chambers 63.

Figures 6, 7, 9:
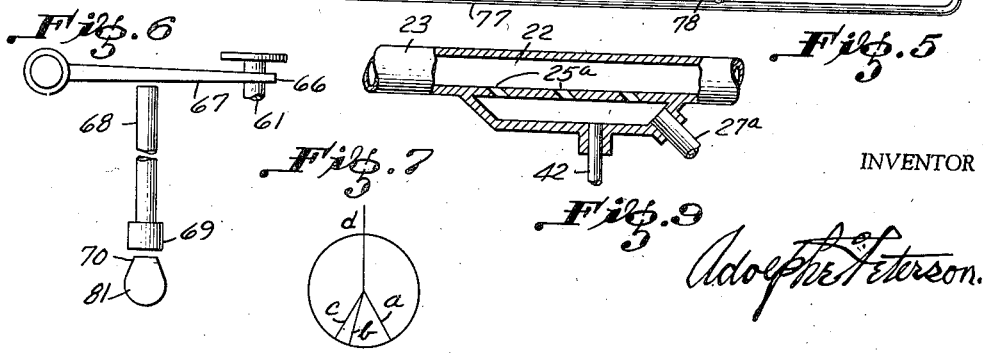

The valves 63 are normally closed by springs 65 and may be lifted cyclically of the engine rotation, by means of the bi-furcated end 66 of the lever 67, the latter in turn lifted by cam rod 68 and cam follower 69 by cam 70, there being one such valve lifting means, as shown in Figure 6, in detail only, for each injection valve 61. The injection is timed so that the injection from the chambers 63 will occur in each engine cylinder 3 in a short period immediately after the engine cylinder exhaust port 71 has closed by the piston upward movement in the cylinder. Thus the fuel injection occurs at a comparatively low pressure just after the exhaust ports close and the pressure of injection, need not be high but only say fifteen to twenty pounds or so. The exhaust ports 71 deliver through exhaust manifold 72 to atmosphere. The sprocket gears 73, 74 on the cam shaft 81 and crank shaft 5 provide a drive for the cam shaft to actuate the valve operating means so that the fuel injection valves are opened cyclically, once each rotation of the crank shaft, and each in the period immediately after the exhaust and inlet ports are closed. The inlet ports 75 are opened by the reciprocating pistons as in two cycle engines generally, and the inlet ports provide for air flow for scavenging the cylinders by air compressed and delivered by the low pressure compressor rotor. The fuel pump 76 is operated by the shaft 57 and is of either the gear type or any vane type pump, and delivers fuel through the pipe 77 to the branch fuel pipes 78, 79 and thereby to the fuel nozzles 78a, 79a and thus to conduit circuit 22. The by-pass pipe 44 is in this case opened or closed by a hand valve 80 for regulation of the fuel by-pass and thus for regulation of the fuel flow per cycle of operation to the conduit circuit 22.

In this form, the operation of the engine cylinders is as in two cycle engines, generally, but the fuel injection from the conduit circuit is directly from the fuel injection chambers 63 to the engine cylinders 3 and this occurs in the early part of the compression strokes of each cylinder. The diagram Figure 7 shows approximately the timing of injection, and injection occurs in the period shown by the chord between radii $b$ and $c$ and air scavenging and exhaust occurs during the period between radii $a$ and $b$ and compression occurs in the period between radii $b$ and $d$.

Figure 5:
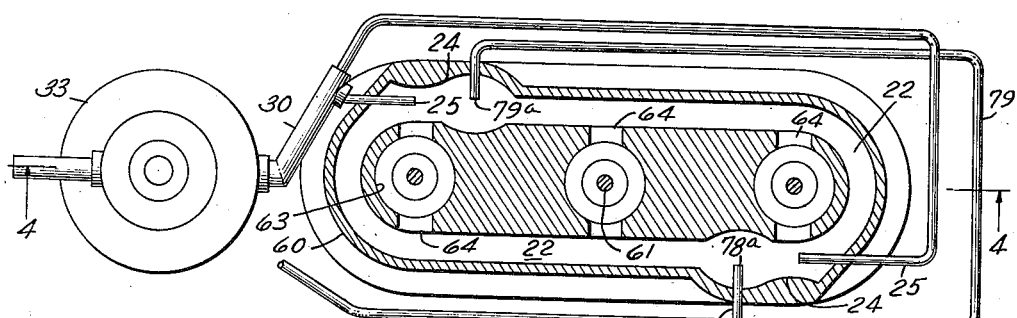

I contemplate that the form of injection shown in Figures 4, 5, may be used for either four or two cycle engines, and that the form shown in Figures 1 and 2 may be used for either two or four cycle engines. The manner of association of the conduit circuit with a series of valves as shown in Figures 4 and 5 may be used with any type of intake valve such as the air intake valves of Figure 1, so that the conduit circuit is in close association with the intake valves chambers and so that thus the passage for injection to the valve chambers is short.

While I have shown the conduit circuit 22, in either of the forms, as having two of the nozzles 25 for the injection of the air under pressure to the conduit circuit, I contemplate that there may be only one of such nozzles 25 for such delivery of air, and likewise that there may be only one of the fuel pipes 42 or 43 delivering to the conduit circuit 22, as one of either of such means is adequate to secure the circuitous movement and the admixture of the fuel.

There may be used, especially in the form in Figure 4, a piston type compressor instead of the centrifugal type shown, especially when the means is used for high pressure injection, as in diesel type engines. The type of compressor necessary will be determined by the type of engine and its compression pressure in the cycle of combustion, and the compressor means for air and the pumping means for fuel is symbolic of such means.

A modified form of nozzle for the conduit circuit for use instead of the type shown, Figures 3 and 5, is illustrated in Figure 9, where the conduit circuit 22 (a section shown only) has the nozzles 25a delivering tangentially or at an angle thereto, and the nozzles 25a deliver from a chamber 25b to which the air pipe 27a and fuel pipe 42 deliver from the compressing and pumping means. The pipes 27a and 42 deliver as in the other forms from the air compressor rotor and the fuel pumping means, and the circuitous movement is as in the first form shown, and the discharge to the valve chambers 15 or 63 is as in the other forms described.

While I have shown particular devices and combinations of devices in the illustration of my invention, I contemplate that other detailed devices and combinations of devices may be used in the realization of my invention, without departing from the spirit and intent thereof.

What I claim is:

1. In a fuel distributing means for combustion engines: a plural number of combustion units each including a combustion chamber and an intake passage thereto; a conduit circuit and a plural number of passages each providing conduction from said conduit circuit, to one of said combustion units; an air compressing means and means driving it; a fuel pumping means and means driving it; a passage from said air compressing means to said conduit circuit to direct air into the conduit circuit to move fluid therein circuitously thereof; a passage from said fuel pumping means to inject fuel to the air stream entering said conduit circuit.

2. The means as specified in claim 1; and in combination; a venturi formed in said conduit circuit at the location of the passage directing air into said conduit circuit to provide for suction from one direction on the air flowing in said conduit circuit, and to provide for impulsion upon the air flowing in said conduit circuit in the direction opposite to said suction.

3. The means as specified in claim 1, and in combination; the said intake passages of said combustion units providing for intake of atmospheric air for combustion in said combustion units to supplement the air delivered from said conduit circuit with the fuel borne thereby.

4. The means as specified in claim 1; the said intake passages and said passages providing conduction from said conduit circuit being each associated, one intake passage with one passage from the conduit circuit, and a valve means in said intake passage to cyclically control movement therethrough, and means cyclically actuating the said valves.

5. In a fuel distributing means for internal combustion engines: a plural number of combustion units each including a combustion cylinder and an intake passage thereto; a reciprocable piston in each said combustion cylinder; a common air manifold to which each intake passage is connected to receive air therefrom, and an air intake to the common air manifold; a fuel fluid manifold having a plural number of ejector nozzles therefrom each discharging fuel fluid to one of said intake passages; a compressor and means actuating the compressor to induct atmospheric air, the said compressor discharging to said fuel fluid manifold; a fuel pumping means actuated at a speed proportionate to the speed of cyclic combustion in said combustion units and discharging to air inducted by said compressor and discharged to said fuel fluid manifold; means regulating air delivery to said common air manifold and means regulating fuel delivery to said air entering said fuel fluid manifold so that said fuel delivery is substantially proportionate to air induction to said common air manifold.

6. The means as specified in claim 1, and in combination; the means driving the said fuel pumping means procuring drive of the fuel pumping means at speed proportionate with the speed of cyclic combustion in the said combustion units, and means for regulating the flow of fuel from said fuel pumping means in accordance with the air volume in said combustion units in cyclic combustion phases.

7. In a fuel distributing means for combustion engines: a plural number of combustion units each including a combustion cylinder and an intake passage thereto; each said combustion cylinder having reciprocable therein a piston; a conduit circuit and a plural number of passages each providing conduction from said conduit circuit to one of said combustion units; an air compressing means and means driving it; a fuel pumping means and means driving it; a passage from said air compressing means to said conduit circuit to direct air into the conduit circuit to move fluid therein circuitously thereof; a passage from said fuel pumping means to inject fuel to the air stream entering said conduit circuit.

8. The means as specified in claim 7 and in combination: a venturi formed in said conduit circuit at the location of the passage directing air into said conduit circuit to provide for suction from one direction on the air flowing in the conduit circuit, and to provide for impulsion upon the air flowing in said conduit circuit in the direction opposite to said suction.

9. The means as specified in claim 7 and in combination; the said intake passages of said combustion units having each an air intake valve associated therewith to cyclically permit flow through the intake passage to the associated combustion cylinders, the said intake passages of said combustion units providing for intake of atmospheric air for combustion in said combustion cylinders to supplement the air delivered from said conduit circuit with the fuel borne thereby.

10. The means as specified in claim 7, and in combination; the said intake passages and said passages providing conduction from said conduit circuit being each associated, one with one passage from the conduit circuit, and a valve means in said intake passage to cyclically control movement therethrough, and means cyclically actuating the said valves.

11. The means specified in claim 7, and in combination: the means driving the said fuel pumping means procuring drive of the fuel pumping means at speed proportionate with the speed of the cyclic combustion in said combustion cylinders, a means for regulating the flow of fuel per cycle from said fuel pumping means to said conduit circuit and a pressure responsive means subjected to pressure in said intake passages and controlling said means for regulating the flow of fuel to effect diminishment of the flow of fuel in proportion to the diminishment of pressure in said intake passages and to effect increase according to increase of pressure in said intake passages.

12. In a fuel distributing means for internal combustion engines; a series of inlet ports each associated with one engine cylinder to permit flow thereto, a conduit circuit having association with the said inlet ports and having a passage to each said port to permit flow independently to each said inlet port from said conduit circuit, means delivering air under pressure above atmospheric pressure to said conduit circuit, means delivering fuel to said conduit circuit, the air being directed to said conduit circuit to effect movement of air with fuel injected thereto circuitously of said conduit circuit; the said conduit circuit having a venturi formed therein at the location of the passage directing air into said conduit circuit to provide for suction from one direction on the air flowing in said conduit circuit, and to provide for impulsion upon the air flowing in said conduit circuit in the opposite direction to said suction.

13. In a fuel distributing means for internal combustion engines; a series of inlet ports each associated with one engine cylinder to permit flow thereto, a conduit circuit having association with the said inlet ports and having a passage to each said port to permit flow independently to each said inlet port from said conduit circuit, means delivering air under pressure above atmospheric pressure to said conduit circuit, means delivering fuel to said conduit circuit, the air being directed to said conduit circuit to effect movement of air with fuel injected thereto circuitously of said conduit circuit; means associated with said inlet ports to supply atmospheric air additionally for flow with the air borne fuel from said conduit circuit and to said engine cylinders.

14. In a fuel distributing means for internal combustion engines; a series of inlet ports each associated with one engine cylinder to permit flow thereto, a conduit circuit having association with the said inlet ports and having a passage for each said port to permit flow independently to each said inlet port from said conduit circuit, means delivering air under pressure above atmospheric pressure to said conduit circuit, means delivering fuel to said conduit circuit, the air being directed to said conduit circuit to effect movement of air with fuel injected thereto circuitously of said conduit circuit; the means delivering fuel to said conduit circuit including means driving it proportionately with the speed of the combustion cycle in said engine cylinders, and including means for regulating the flow per cycle to said conduit circuit.

15. In means of the character described: a series of injection chambers, each injection chamber having a port for ejection to a combustion chamber of an associated engine means; a conduit circuit adjacent to and about the said injection chambers, the said conduit circuit having a port from it to each injection chamber the said ports being independent each from the others; a means delivering air under pressure to nozzle means directing the air into said conduit circuit to impel circuitous flow of air in said conduit circuit; a means delivering fuel under pressure to said conduit circuit for admixture with the air delivered therethrough.

16. The means specified in claim 15, and in combination; the said conduit circuit having formed therein, at the location of the means directing air thereinto, a venturi whereby air from one direction is drawn by the directed air and air is impelled in the opposite direction by said directed air.

17. In a fuel distributing means for combustion engines: a plural number of engine cylinders, each having a piston reciprocable therein, and air intake ports one to each of said cylinders the said air intake ports receiving atmospheric air from passage means therefore; a conduit having passages of substantially equal volumetric capacity each delivering from said conduit to one of said air intake ports; an air blower inducting air from atmosphere and delivering to a mixing passage; a fuel pumping means driven at speed proportionate to the speed of the reciprocation of said pistons and delivering fuel to said mixing passage for admixture with air passing therethrough; the said mixing passage having connection with said conduit to deliver the mixture of air and fuel thereto.

18. The means as specified in claim 17, and in combination: the said passage means providing atmospheric air entry to said air intake ports having a throttle means therein, a pressure responsive means responsive to pressure in said passage means between said throttle means and said air intake ports, said pressure responsive means having in actuable connection with it a fuel regulation means for diminishment or increase proportionately of the fuel delivered by the fuel pumping means to the said mixing passage.

References Cited in the file of this patent

UNITED STATES PATENTS

| | | |
|---|---|---|
| 906,393 | Dock | Dec. 8, 1908 |
| 1,625,997 | Gronkwist | Apr. 26, 1927 |
| 1,938,164 | Zurmuhle | Dec. 5, 1933 |